United States Patent
Sasao et al.

(10) Patent No.: US 8,687,615 B2
(45) Date of Patent: Apr. 1, 2014

(54) MOBILE WIRELESS COMMUNICATION TERMINAL AND WIRELESS COMMUNICATION METHOD

(75) Inventors: Nobuaki Sasao, Kawasaki (JP); Jun Hashimoto, Yokohama (JP); Hisashi Takeshita, Yokosuka (JP); Kentaro Itagaki, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 243 days.

(21) Appl. No.: 13/128,126

(22) PCT Filed: Nov. 5, 2009

(86) PCT No.: PCT/JP2009/068913
§ 371 (c)(1), (2), (4) Date: Jul. 8, 2011

(87) PCT Pub. No.: WO2010/053126
PCT Pub. Date: May 14, 2010

(65) Prior Publication Data
US 2011/0261798 A1    Oct. 27, 2011

(30) Foreign Application Priority Data
Nov. 7, 2008  (JP) ................ P2008-286649

(51) Int. Cl.
*H04W 88/02*        (2009.01)
(52) U.S. Cl.
USPC .......................... 370/338; 370/328
(58) Field of Classification Search
USPC ............. 370/231–235, 338; 455/7
See application file for complete search history.

(56) References Cited

U.S. PATENT DOCUMENTS

2002/0013151 A1    1/2002  Saito et al.
(Continued)

FOREIGN PATENT DOCUMENTS

EP    1589677 A1 * 10/2005
(Continued)

OTHER PUBLICATIONS

International Preliminary Report on Patentability and Written Opinion issued on Jun. 30, 2011 in corresponding International Application No. PCT/JP2009/068913 filed on Nov. 5, 2009.

(Continued)

*Primary Examiner* — Huy D Vu
*Assistant Examiner* — Teisha D Hall
(74) *Attorney, Agent, or Firm* — Oblon, Spivak, McCelland, Maier & Neustadt, L.L.P.

(57) ABSTRACT

An HGW mobile device 20 can perform data communication on the basis of a plurality of wireless communication methods with different theoretical maximum transmission speeds, i.e., on the basis of a mobile wireless communication method and a wireless LAN communication method. Since the HGW mobile device 20 is provided with a mobile wireless communication unit 210 and a wireless LAN communication unit 250, it is able to relay data transmission between an external network 10 and a client terminal 30. A transmission speed initializing unit 230 sets a value according to a theoretical maximum transmission speed of the wireless communication method with the slower theoretical maximum transmission speed, i.e., the theoretical maximum transmission speed of the mobile wireless communication method, as an initial transmission speed for the wireless LAN communication unit 250 to first start wireless LAN communication with the client terminal 30 on the basis of the wireless LAN communication method.

4 Claims, 4 Drawing Sheets

(56) References Cited

U.S. PATENT DOCUMENTS

| | | |
|---|---|---|
| 2004/0068668 A1* | 4/2004 | Lor et al. ............... 713/201 |
| 2004/0259545 A1 | 12/2004 | Morita |
| 2005/0148315 A1 | 7/2005 | Sawada |
| 2006/0003703 A1 | 1/2006 | Yahagi |

FOREIGN PATENT DOCUMENTS

| | | |
|---|---|---|
| JP | 2002 33698 | 1/2002 |
| JP | 2005 167305 | 6/2005 |
| JP | 2006 19773 | 1/2006 |
| JP | 2006019773 A * | 1/2006 |
| JP | 2006 48225 | 2/2006 |
| WO | 2004 068742 | 8/2004 |

OTHER PUBLICATIONS

International Search Report Issued Feb. 9, 2010 in PCT/JP09/068913 filed Nov. 5, 2009.

Office Action Issed Nov. 16, 2010 in Japanese Patent Application No. P2008-286649 filed Nov. 7, 2008 (with partial English translation).

Office Action issued on Apr. 18, 2013 in the corresponding Chinese Patent Application No. 200980143971.9 (with English Translation).

* cited by examiner

MOBILE WIRELESS COMMUNICATION TERMINAL AND WIRELESS COMMUNICATION METHOD

TECHNICAL FIELD

The present invention relates to a mobile wireless communication terminal and a wireless communication method.

BACKGROUND ART

In general wireless LAN communication, an access point installed at public facilities or at home is connected through a broadband line with an external device or a network, and a session is set up between a communication terminal with a wireless LAN function and the foregoing access point, whereby the communication terminal can perform communication with the external device or the network. Examples of the communication terminal with the wireless LAN function include a personal computer, a game machine, a cell phone, a household electrical appliance, and so on. Patent Literature 1 below discloses, as a specific example of such communication, a home appliance network system consisting of an external device, a home gateway connected via the Internet with the external device, and a household electrical appliance to perform wireless communication under the home gateway.

CITATION LIST

Patent Literature

Patent Literature 1: Japanese Patent Application Laid-open Publication No. 2008-48225

SUMMARY OF INVENTION

Technical Problem

Incidentally, the access point or the home gateway existing between the external network and the communication terminal with the wireless LAN function can be composed of a dedicated device, an ordinary computer system, or the like, and is usually used as installed at a fixed location. In recent years, however, there are increasing demands for providing the access point, the home gateway, etc. with portability. For configuring a system by providing a portable device with the function of the access point, the home gateway, or the like, it is preferred to prevent increase in call loss probability in full consideration of transmission speed of the portable device.

The present invention has been accomplished in view of the above circumstances and an object of the present invention is to provide a mobile wireless communication terminal capable of executing an access point function, while increasing transfer efficiency with reduction in call loss probability, and a wireless communication method using the mobile wireless communication terminal.

Solution to Problem

In order to solve the above problem, a mobile wireless communication terminal according to the present invention is a mobile wireless communication terminal capable of performing data communication on the basis of a plurality of wireless communication methods with different maximum transmission speeds, the mobile wireless communication terminal comprising: a first wireless communication unit which performs first data communication with an external network on the basis of a first wireless communication method, thereby to relay data transmitted between the external network and a client terminal belonging under the mobile wireless communication terminal; a second wireless communication unit which performs second data communication with the client terminal on the basis of a second wireless communication method, thereby to relay data transmitted between the external network and the client terminal; a transmission speed grasping unit which obtains a grasp of respective maximum transmission speeds of the first wireless communication method and the second wireless communication method; and a transmission speed initializing unit which, based on the result of the grasp by the transmission speed grasping unit, sets a value according to the maximum transmission speed of the wireless communication method with the slower maximum transmission speed out of the first wireless communication method and the second wireless communication method, as an initial transmission speed for the second wireless communication unit to first start the second data communication with the client terminal on the basis of the second wireless communication method.

A wireless communication method according to the present invention is a wireless communication method using a mobile wireless communication terminal capable of performing data communication on the basis of a plurality of wireless communication methods with different maximum transmission speeds, the wireless communication method comprising: a first wireless communication step wherein first wireless communication unit of the mobile wireless communication terminal performs first data communication with an external network on the basis of a first wireless communication method, thereby to relay data transmitted between the external network and a client terminal belonging under the mobile wireless communication terminal; and a second wireless communication step wherein second wireless communication unit of the mobile wireless communication terminal performs second data communication with the client terminal on the basis of a second wireless communication method, thereby to relay data transmitted between the external network and the client terminal, the wireless communication method further comprising: a transmission speed grasping step wherein transmission speed grasping unit of the mobile wireless communication terminal obtains a grasp of respective maximum transmission speeds of the first wireless communication method and the second wireless communication method; and a transmission speed initializing step wherein, based on the result of the grasp by the transmission speed grasping unit, transmission speed initializing unit of the mobile wireless communication terminal sets a value according to the maximum transmission speed of the wireless communication method with the slower maximum transmission speed out of the first wireless communication method and the second wireless communication method, as an initial transmission speed for the second wireless communication unit to first start the second data communication with the client terminal on the basis of the second wireless communication method.

In the mobile wireless communication terminal and the wireless communication method of the present invention as described above, the mobile wireless communication terminal comprises the first wireless communication unit and the second wireless communication unit, whereby it can relay data transmission between the external network and the client terminal under the communication terminal. When the wireless communication terminal with portability is equipped with the data transmission relay function in this manner, the data transmission between the external network and the client terminal can be performed through the mobile wireless communication terminal as a data transmission relay device, even at a location where there is no data transmission relay device installed fixedly.

In the mobile wireless communication terminal and the wireless communication method of the present invention, the transmission speed initializing unit sets the value according to the maximum transmission speed of the wireless communication method with the slower maximum transmission speed, as the initial transmission speed for the second wireless communication unit to first start the second data communication with the client terminal on the basis of the second wireless communication method. Since negotiations to start the second data communication are initiated from the low transmission speed in this manner, a probability of communication failure in the second data communication becomes low. Therefore, it is feasible to prevent increase in call loss probability due to communication failure and to increase the transfer efficiency as a result.

Preferably, when the maximum transmission speed of the first wireless communication method is slower than the maximum transmission speed of the second wireless communication method, the transmission speed grasping unit grasps a real maximum transmission speed during an operation in which the first wireless communication unit performs the first data communication with the external network on the basis of the first wireless communication method, and the transmission speed initializing unit sets a value according to the real maximum transmission speed as an initial transmission speed for the second wireless communication unit to next or thereafter start the second data communication with the client terminal.

According to this invention, the transmission speed grasping unit grasps the real maximum transmission speed in the first data communication during actual execution of the first data communication between the first wireless communication unit and the external network. Then the transmission speed initializing unit sets the initial transmission speed for the second wireless communication unit to next or thereafter start the second data communication with the client terminal, using the real maximum transmission speed. These functions are performed when the maximum transmission speed of the first wireless communication method is slower than the maximum transmission speed of the second wireless communication method.

Namely, the transmission speed grasping unit learns the real maximum transmission speed in the first data communication and the transmission speed initializing unit initializes the transmission speed in resuming the second data communication, using the learnt real maximum transmission speed. For this reason, the accuracy of the transmission speed initializing process in the second data communication becomes high and the probability of communication failure in the second data communication becomes lower. Therefore, it is feasible to further prevent the increase in call loss probability due to communication failure and to further increase the transfer efficiency as a result.

Preferably, when the maximum transmission speed of the first wireless communication method is slower than the maximum transmission speed of the second wireless communication method, the transmission speed grasping unit grasps an average transmission speed during an operation in which the first wireless communication unit performs the first data communication with the external network on the basis of the first wireless communication method, and the transmission speed initializing unit sets a value according to the average transmission speed as an initial transmission speed for the second wireless communication unit to next or thereafter start the second data communication with the client terminal.

According to this invention, the transmission speed grasping unit grasps the average transmission speed in the first data communication during actual execution of the first data communication between the first wireless communication unit and the external network. Then the transmission speed initializing unit sets the initial transmission speed for the second wireless communication unit to next or thereafter start the second data communication with the client terminal, using the average transmission speed. These functions are performed when the maximum transmission speed of the first wireless communication method is slower than the maximum transmission speed of the second wireless communication method.

Namely, the transmission speed grasping unit learns the average transmission speed in the first data communication and the transmission speed initializing unit initializes the transmission speed in resuming the second data communication, using the learnt average transmission speed. For this reason, the accuracy of the transmission speed initializing process in the second data communication becomes high and the probability of communication failure in the second data communication becomes lower. Therefore, it is feasible to further prevent the increase in call loss probability due to communication failure and to further increase the transfer efficiency as a result.

Preferably, the mobile wireless communication terminal further comprises transmission speed controlling unit which controls the transmission speed of the second wireless communication unit in such a manner that when the second wireless communication unit fails to perform the second data communication at the initial transmission speed with the client terminal, the second wireless communication unit retries a start of the second data communication at transmission speeds gradually decreased from the initial transmission speed.

Since the start of the second data communication is retried at the transmission speeds gradually decreased from the initial transmission speed in this manner, an optimal transmission speed for the start of the second data communication can be determined.

The mobile wireless communication terminal may be configured as follows: the first wireless communication method is a mobile wireless communication method; the second wireless communication method is a wireless LAN communication method; the transmission speed initializing unit sets a value according to a maximum transmission speed of the mobile wireless communication method, as an initial transmission speed for the second wireless communication unit to first start the second data communication with the client terminal on the basis of the wireless LAN communication method.

The present invention is particularly useful in the case where the first wireless communication method is the mobile wireless communication method and where the second wireless communication method is the wireless LAN communication method.

Advantageous Effects of Invention

The present invention provides the mobile wireless communication terminal capable of executing the data transmission relay function, while increasing the transfer efficiency with reduction in call loss probability, and the wireless communication method using the mobile wireless communication terminal.

LIST OF REFERENCE SIGNS 1 wireless communication system;
10 external network;
20 HGW mobile device;
210 mobile wireless communication unit;
220 transmission speed grasping unit;
230 transmission speed initializing unit;
240 transmission speed controlling unit;
250 wireless LAN communication unit;
30 client terminal.

DESCRIPTION OF EMBODIMENTS

The preferred embodiments of the mobile wireless communication terminal and the wireless communication method according to the present invention will be described below in detail with reference to the accompanying drawings. In the description of the drawings the same elements will be denoted by the same reference signs, without redundant description.

(Total Construction of Wireless Communication System 1)

Figure 1:
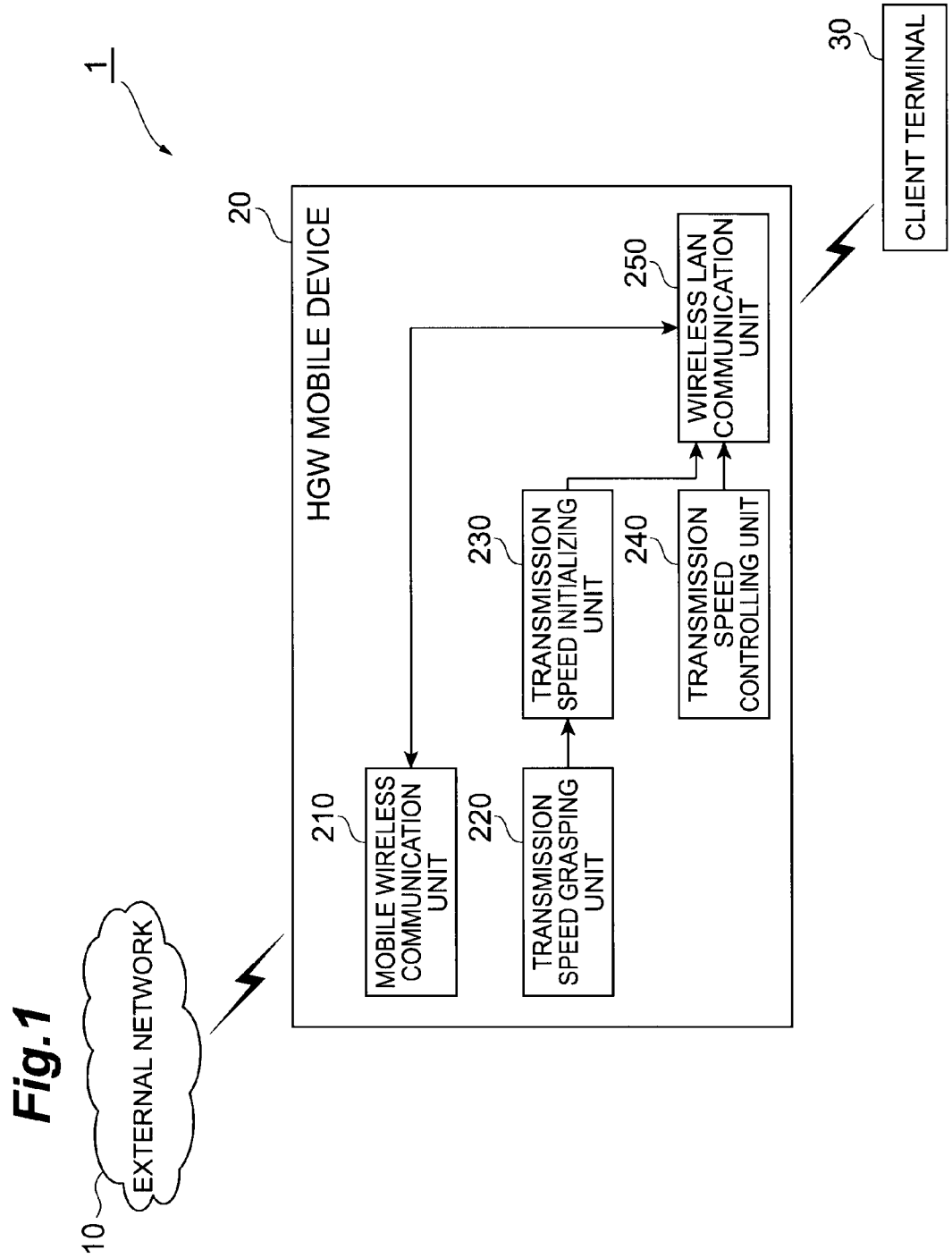
FIG. 1 is a schematic diagram of a configuration of wireless communication system 1.

First, a configuration of wireless communication system 1 according to an embodiment of the present invention will be described with reference to FIG. 1. FIG. 1 is a schematic diagram of the configuration of wireless communication system 1. As shown in FIG. 1, the wireless communication system 1 is constructed with an external network 10, an HGW mobile device 20 (corresponding to the "mobile wireless communication terminal" in the scope of claims), and a client terminal 30.

The external network 10 is an external server, device, or the like to supply data to the client terminal 30 and to be a recipient of data from the client terminal 30, e.g., a web server, a content server, a mail server, or the like.

The HGW mobile device 20 is a wireless communication terminal with portability, e.g., a cell phone or the like. This HGW mobile device 20 is equipped with a data transmission relay function and is able to relay data transmission between the external network 10 and the client terminal 30. Namely, the HGW mobile device 20 functions as a home gateway (Home Gateway) in the wireless communication system 1. The details of the configuration and functions of this HGW mobile device 20 will be described later.

The client terminal 30 belongs under the HGW mobile device 20 and receives data from the external network 10 through the data transmission relay function of the HGW mobile device 20. The client terminal 30 can also transmit its own data through the HGW mobile device 20 to the external network 10. Specific examples of the client terminal 30 are a personal computer, a game machine, a cell phone, a household electrical appliance, and so on.

The system is configured so as to allow data communication between the external network 10 and the HGW mobile device 20 by a mobile wireless communication method (corresponding to the "first wireless communication method" in the scope of claims) and to allow data communication between the HGW mobile device 20 and the client terminal 30 by a wireless LAN communication method (corresponding to the "second wireless communication method" in the scope of claims). Namely, the external network 10 and HGW mobile device 20 have a function to perform wireless communication by the mobile wireless communication method and the HGW mobile device 20 and client terminal 30 have a function to perform wireless communication by the wireless LAN communication method. The mobile wireless communication method herein is, for example, FOMA (abbreviation of Freedom Of Mobile multimedia Access; registered trademark) and in this case a theoretical maximum transmission speed (corresponding to the "maximum transmission speed" in the scope of claims) is 7.2 Mbps, particularly, in the case of HSDPA (abbreviation of High SpeedDownlink Packet Access). In the wireless LAN communication method a theoretical maximum transmission speed is 54 Mbps, particularly, in the case of 802.11 g. Namely, the theoretical maximum transmission speed in the mobile wireless communication method is slower than the theoretical maximum transmission speed in the wireless LAN communication method. The HGW mobile device 20 can perform the data communication on the basis of a plurality of wireless communication methods with different theoretical maximum transmission speeds such as the mobile wireless communication method and the wireless LAN communication method.

(Configuration of HGW Mobile Device 20)

Figure 2:
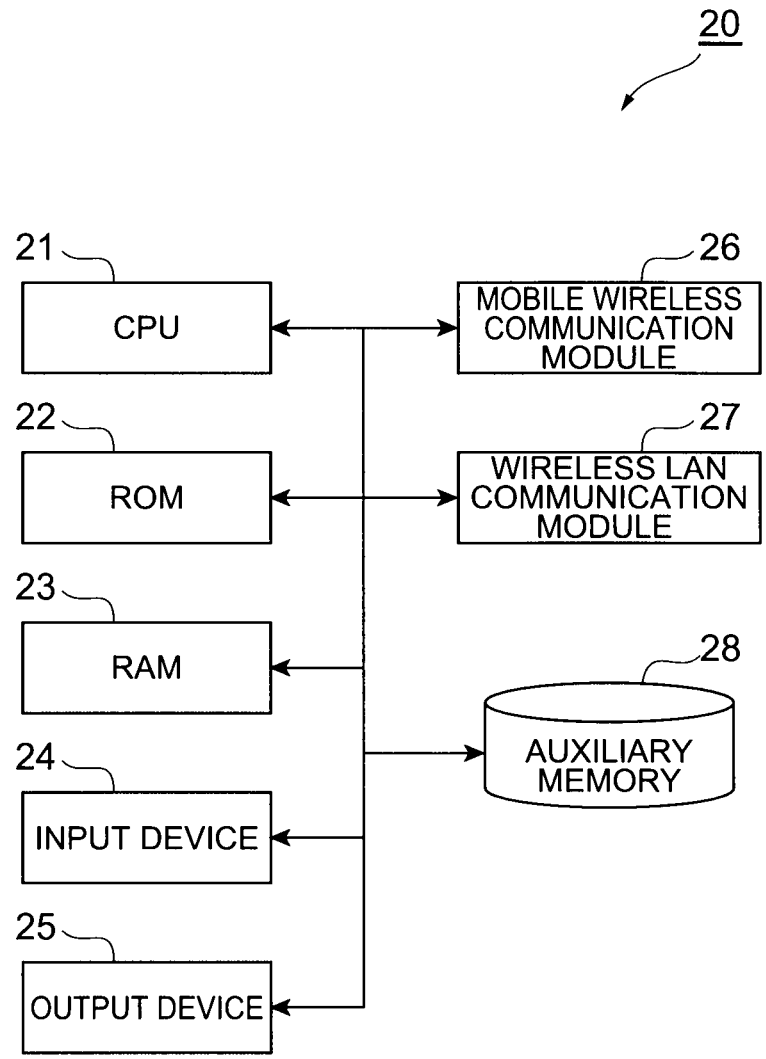
FIG. 2 is a hardware configuration diagram of HGW mobile device 20.

The HGW mobile device 20 will be described below in detail. FIG. 2 is a hardware configuration diagram of the HGW mobile device 20. As shown in FIG. 2, the HGW mobile device 20 is physically constructed with a CPU 21, ROM 22 and RAM 23 as main memories, an input device 24 like operation buttons, an output device 25 like an LCD or organic EL display, a mobile wireless communication module 26 to perform transmission/reception of data to or from the external network 10 on the basis of the mobile wireless communication method, a wireless LAN communication module 27 to perform transmission/reception of data to or from the client terminal 30 on the basis of the wireless LAN communication method, and an auxiliary memory 28 such as a memory device. Each of below-described functions of the HGW mobile device 20 is implemented by retrieving predetermined software onto hardware such as the CPU 21, ROM 22, and RAM 23 so as to make the input device 24, output device 25, mobile wireless communication module 26, and wireless LAN communication module 27 operate under control of CPU 21, and carrying out readout and writing of data in the main memories 22, 23 and the auxiliary memory 28.

Referring back to FIG. 1, the HGW mobile device 20 is functionally constructed with a mobile wireless communication unit 210 (corresponding to the "first wireless communication unit" in the scope of claims), a transmission speed grasping unit 220 (corresponding to the "transmission speed grasping unit" in the scope of claims), a transmission speed initializing unit 230 (corresponding to the "transmission speed initializing unit" in the scope of claims), a transmission speed controlling unit 240 (corresponding to the "transmission speed controlling unit" in the scope of claims), and a wireless LAN communication unit 250 (corresponding to the "second wireless communication unit" in the scope of claims).

The mobile wireless communication unit 210 performs mobile wireless communication (corresponding to the "first data communication" in the scope of claims) with the external network 10 on the basis of the mobile wireless communication method, thereby to relay data transmitted between the external network 10 and the client terminal 30. Namely, the mobile wireless communication unit 210 has a function to receive incoming data directed to the client terminal 30 from the external network 10 and output the data to the wireless LAN communication unit 250, and a function to receive outgoing data from the client terminal 30 through the wireless LAN communication unit 250 and send the data to the external network 10.

The wireless LAN communication unit 250 performs wireless LAN communication with the client terminal 30 on the basis of the wireless LAN communication method, thereby to relay data transmitted between the client terminal 30 and the external network 10. Namely, the wireless LAN communication unit 250 has a function to receive outgoing data to the external network 10 from the client terminal 30 and output the data to the mobile wireless communication unit 210, and a function to receive incoming data from the external network 10 through the mobile wireless communication unit 210 and transmit the data to the client terminal 30.

The transmission speed grasping unit 220 obtains a grasp of respective theoretical maximum transmission speeds of the mobile wireless communication method and the wireless LAN communication method. In the present embodiment, the transmission speed grasping unit 220 grasps the theoretical maximum transmission speed of the mobile wireless communication method being 7.2 Mbps and the theoretical maximum transmission speed of the wireless LAN communication method being 54 Mbps. In addition to them, the transmission speed grasping unit 220 obtains a grasp of a real maximum transmission speed and an average transmission speed during an operation in which the mobile wireless communication unit 210 carries out the mobile wireless communication with the external network 10 on the basis of the mobile wireless communication method. The transmission speed grasping unit 220 outputs information indicative of the grasped theoretical maximum transmission speed, real maximum transmission speed, and average transmission speed to the transmission speed initializing unit 230.

The transmission speed initializing unit 230 is a unit that, based on the result of the grasp of the theoretical maximum transmission speeds by the transmission speed grasping unit 220, sets a value according to the theoretical maximum transmission speed of the wireless communication method with the slower theoretical maximum transmission speed out of the mobile wireless communication method and the wireless LAN communication method, i.e., the theoretical maximum transmission speed of the mobile wireless communication method (7.2 Mbps as described above), as an initial transmission speed for the wireless LAN communication unit 250 to first start the wireless LAN communication with the client terminal 30 on the basis of the wireless LAN communication method. The transmission speed initializing unit 230 outputs information indicative of the set initial transmission speed to the wireless LAN communication unit 250 and the wireless LAN communication unit 250 starts the wireless LAN communication with the client terminal 30 at the initial transmission speed thus set.

In addition to it, the transmission speed initializing unit 230 has a function to, based on the result of the grasp of the real maximum transmission speed by the transmission speed grasping unit 220 during the operation in which the mobile wireless communication unit 210 performs the mobile wireless communication with the external network 10 on the basis of the mobile wireless communication method, set a value according to the real maximum transmission speed, as an initial transmission speed for the wireless LAN communication unit 250 to next or thereafter start the wireless LAN communication with the client terminal 30. The "next" herein means next to the aforementioned "first." In setting the initial transmission speed for the next or subsequent communication, it is also possible to further use the aforementioned theoretical maximum transmission speed in addition to the real maximum transmission speed and in this case, for example, the real maximum transmission speed and the theoretical maximum transmission speed may be given appropriate weights.

Furthermore, the transmission speed initializing unit 230 has a function to, based on the result of the grasp of the average transmission speed by the transmission speed grasping unit 220 during the operation in which the mobile wireless communication unit 210 performs the mobile wireless communication with the external network 10 on the basis of the mobile wireless communication method, set a value according to the average transmission speed, as an initial transmission speed for the wireless LAN communication unit 250 to next or thereafter start the wireless LAN communication with the client terminal 30. In setting the initial transmission speed for the next or subsequent communication, it is also possible to further use the aforementioned real maximum transmission speed and theoretical maximum transmission speed in addition to the average transmission speed and in this case, for example, the average transmission speed, the real maximum transmission speed, and the theoretical maximum transmission speed may be given appropriate weights. If the transmission speed is desired to be as high as possible, it is preferred to set the initial transmission speed through the use of the real maximum transmission speed. On the other hand, if stable communication is desired rather than the transmission speed, it is preferred to set the initial transmission speed through the use of the average transmission speed.

The transmission speed controlling unit 240 controls the transmission speed of the wireless LAN communication unit 250 in such a manner that when the wireless LAN communication unit 250 fails to perform the wireless LAN communication at the initial transmission speed with the client terminal 30, it retries a start of the wireless LAN communication at transmission speeds gradually decreased from the initial transmission speed. The transmission speed controlling unit 240 outputs to the wireless LAN communication unit 250 a control signal indicating that the start of the wireless LAN communication is to be retried at the transmission speeds gradually decreased from the initial transmission speed, and the wireless LAN communication unit 250 retries the start of the wireless LAN communication with the client terminal 30 at the gradually decreased transmission speeds on the basis of the control signal. This transmission speed control operation of the transmission speed controlling unit 240 is carried out regardless of whether the wireless LAN communication between the wireless LAN communication unit 250 and the client terminal 30 is the first, the next, or subsequent one.

(Operation of Wireless Communication System 1)

The operation carried out by the wireless communication system 1 will be described below with reference to FIGS. 3 and 4.

(Operation of Wireless Communication System 1, No. 1)

Figure 3:
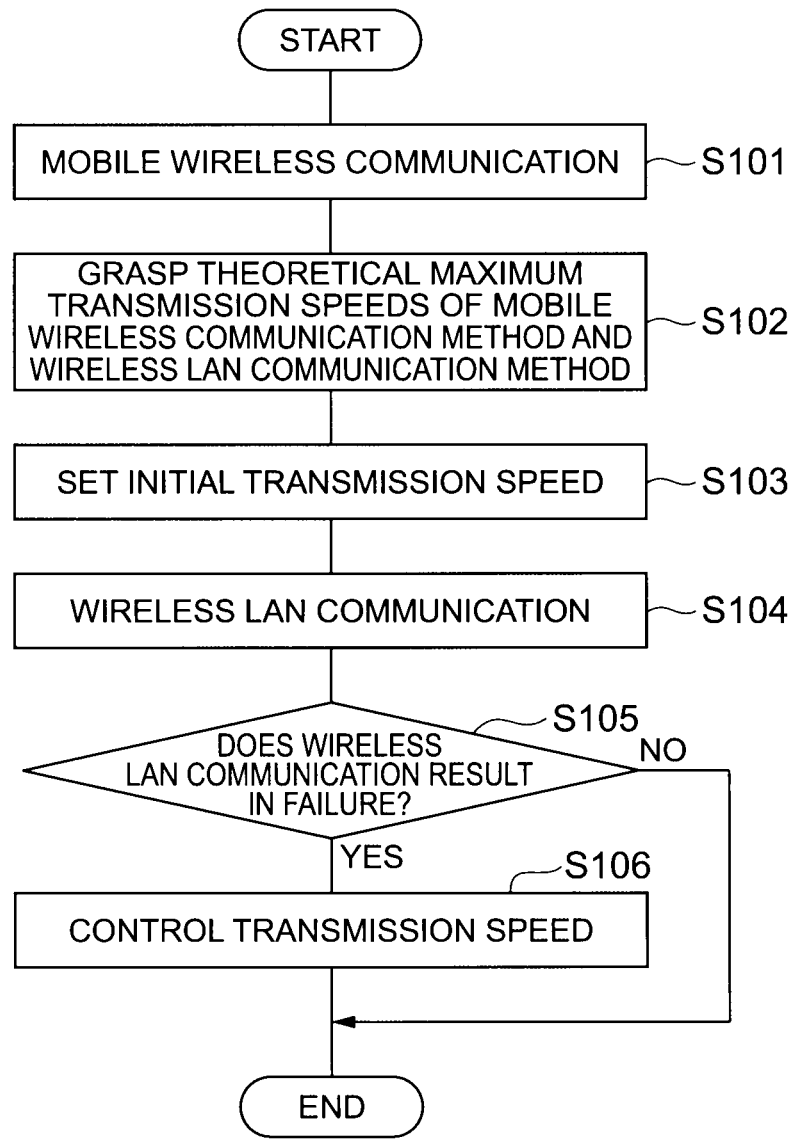
FIG. 3 is a flowchart showing an example of operation of wireless communication system 1.

FIG. 3 is a flowchart showing an example of the operation of the wireless communication system 1. Particularly, FIG. 3 shows the operation of the wireless communication system 1 in a situation where the HGW mobile device 20 relays incoming data from the external network 10 to the client terminal 30 and where the data relay operation of the HGW mobile device 20 is carried out first.

First, the mobile wireless communication unit 210 of the HGW mobile device 20 receives incoming data directed to the client terminal 30, from the external network 10. This operation is carried out in such a manner that the mobile wireless communication unit 210 of the HGW mobile device 20 performs the mobile wireless communication with the external network 10 on the basis of the mobile wireless communication method (step S101, corresponding to the "first wireless communication step" in the scope of claims).

Next, the transmission speed grasping unit 220 of the HGW mobile device 20 obtains a grasp of the respective theoretical maximum transmission speeds of the mobile wireless communication method and the wireless LAN communication method being 7.2 Mbps and 54 Mbps. The transmission speed grasping unit 220 outputs information indicative of the grasped theoretical maximum transmission speeds to the transmission speed initializing unit 230 (step S102, corresponding to the "transmission speed grasping step" in the scope of claims).

Next, based on the result of the grasp of the theoretical maximum transmission speeds by the transmission speed grasping unit 220, the transmission speed initializing unit 230 of the HGW mobile device 20 sets a value according to the theoretical maximum transmission speed of the wireless communication method with the slower theoretical maximum transmission speed out of the mobile wireless communication method and the wireless LAN communication method, i.e., the theoretical maximum transmission speed of the mobile wireless communication method (7.2 Mbps as described above), as an initial transmission speed for the wireless LAN communication unit 250 to first start the wireless LAN communication with the client terminal 30 on the basis of the wireless LAN communication method. The transmission speed initializing unit 230 outputs information indicative of the set initial transmission speed to the wireless LAN communication unit 250 (step S103, corresponding to the "transmission speed initializing step" in the scope of claims).

The above description concerned the case where step S102 and step S103 were carried out after step S101, but, without having to be limited to this, the processes of step S102 and step S103 may be carried out prior to step S101.

Next, the wireless LAN communication unit 250 of the HGW mobile device 20 transmits the incoming data from the external network 10 to the client terminal 30 at the set initial transmission speed, based on the information indicative of the initial transmission speed received from the transmission speed initializing unit 230 in step S103. This operation is carried out in such a manner that the wireless LAN communication unit 250 of the HGW mobile device 20 starts the wireless LAN communication with the client terminal 30 at the initial transmission speed on the basis of the wireless LAN communication method (step S104, corresponding to the "second wireless communication step" in the scope of claims).

Next, when the above operation of step S104 results in a failure, namely, when the wireless LAN communication unit 250 of the HGW mobile device 20 fails to perform the wireless LAN communication at the initial transmission speed with the client terminal 30 (step S105:YES), the transmission speed controlling unit 240 of the HGW mobile device 20 controls the transmission speed of the wireless LAN communication unit 250 so as to retry a start of the wireless LAN communication at transmission speeds gradually decreased from the initial transmission speed (step S106).

On the other hand, when the above operation of step S104 results in a success (step S105: NO), the processing is terminated without execution of above step S106.

(Operation of Wireless Communication System 1, No. 2)

Figure 4:
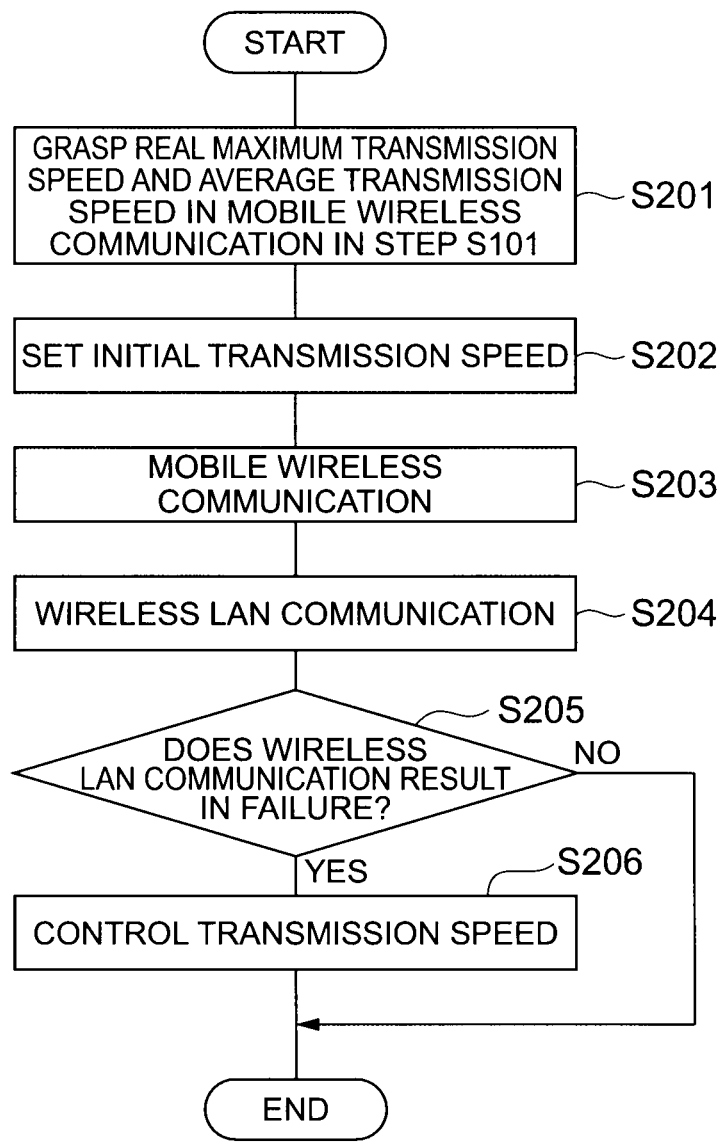
FIG. 4 is a flowchart showing another example of operation of wireless communication system 1.

FIG. 4 is a flowchart showing another example of the operation of the wireless communication system 1. Particularly, FIG. 4 shows the operation of the wireless communication system 1 in a situation where the HGW mobile device 20 relays incoming data from the external network 10 to the client terminal 30 and where the data relay operation of the HGW mobile device 20 has been conducted before, i.e., the sequential processing described above with reference to FIG. 3 (the sequential processing including at least step S101) has been carried out at least once prior to sequential processing of steps S202 to S206 described below.

First, the transmission speed grasping unit 220 of the HGW mobile device 20 obtains a grasp of the real maximum transmission speed and average transmission speed during an operation in which the mobile wireless communication unit 210 of the HGW mobile device 20 performs the mobile wireless communication with the external network 10 on the basis of the mobile wireless communication method, in execution of the above process of step S101. The transmission speed grasping unit 220 outputs information indicative of the grasped real maximum transmission speed and average transmission speed to the transmission speed initializing unit 230 (step S201).

Next, based on the result of the grasp of the real maximum transmission speed and average transmission speed by the transmission speed grasping unit 220, the transmission speed initializing unit 230 of the HGW mobile device 20 sets a value according to the real maximum transmission speed and average transmission speed, as an initial transmission speed for the wireless LAN communication unit 250 to resume the wireless LAN communication with the client terminal 30. The transmission speed initializing unit 230 may give appropriate weights to the average transmission speed and real maximum transmission speed or may set the initial transmission speed using a larger value within a tolerance than the average transmission speed and real maximum transmission speed. The tolerance herein can be appropriately determined in consideration of an actual transmission situation. The transmission speed initializing unit 230 outputs information indicative of the set initial transmission speed to the wireless LAN communication unit 250 (step S202).

Next, the mobile wireless communication unit 210 of the HGW mobile device 20 receives the incoming data directed to the client terminal 30, from the external network 10. This operation is carried out in such a manner that the mobile wireless communication unit 210 of the HGW mobile device 20 performs the mobile wireless communication with the external network 10 on the basis of the mobile wireless communication method (step S203, corresponding to the "first wireless communication step" in the scope of claims).

The above description concerned the case where step S203 was carried out after step S201 and step S202, but, without having to be limited to this, the process of step S203 may be carried out prior to steps S201 and S202.

Next, the wireless LAN communication unit 250 of the HGW mobile device 20 transmits the incoming data from the external network 10 to the client terminal 30 at the set initial transmission speed, based on the information indicative of the initial transmission speed received from the transmission speed initializing unit 230 in step S202. This operation is carried out in such a manner that the wireless LAN communication unit 250 of the HGW mobile device 20 resumes the wireless LAN communication with the client terminal 30 at the initial transmission speed on the basis of the wireless LAN communication method (step S204, corresponding to the "second wireless communication step" in the scope of claims).

Next, when the above operation of step S204 results in a failure, namely, when the wireless LAN communication unit 250 of the HGW mobile device 20 fails to resume the wireless LAN communication at the initial transmission speed with the client terminal 30 (step S205: YES), the transmission speed controlling unit 240 of the HGW mobile device 20 controls the transmission speed of the wireless LAN communication unit 250 so as to retry a restart of the wireless LAN communication at transmission speeds gradually decreased from the initial transmission speed (step S206).

On the other hand, when the above operation of step S204 results in a success (step S205: NO), the processing is terminated without execution of above step S206.

(Action and Effect of Present Embodiment)

The action and effect of the wireless communication system 1 according to the present embodiment will be described below. In the wireless communication system 1 of the present embodiment, the HGW mobile device 20 is provided with the mobile wireless communication unit 210 and the wireless LAN communication unit 250, and therefore it is able to relay data transmission between the external network 10 and the client terminal 30 under the HGW mobile device 20. When the HGW mobile device 20 with portability is equipped with the data transmission relay function in this manner, the data transmission between the external network 10 and the client terminal 30 can be performed through the HGW mobile device 20 as a data transmission relay device, even at a location where there is no data transmission relay device installed fixedly.

In the wireless communication system 1 of the present embodiment, the transmission speed initializing unit 230 sets the value according to the theoretical maximum transmission speed of the wireless communication method with the slower theoretical maximum transmission speed, i.e., the theoretical maximum transmission speed of the mobile wireless communication method, as the initial transmission speed for the wireless LAN communication unit 250 to first start the wireless LAN communication with the client terminal 30 on the basis of the wireless LAN communication method. Since negotiations to start the wireless LAN communication are initiated from the low transmission speed in this manner, a probability of communication failure in the wireless LAN communication is low. Therefore, it is feasible to prevent the increase in call loss probability due to communication failure and thus to increase the transfer efficiency as a result.

In the present embodiment, the transmission speed grasping unit 220 grasps the real maximum transmission speed in the mobile wireless communication during the operation in which the mobile wireless communication is actually carried out between the mobile wireless communication unit 210 and the external network 10. Then the transmission speed initializing unit 230 sets the initial transmission speed for the wireless LAN communication unit 250 to next or thereafter start the wireless LAN communication with the client terminal 30, using the real maximum transmission speed.

Namely, the transmission speed grasping unit 220 learns the real maximum transmission speed in the mobile wireless communication and the transmission speed initializing unit 230 initializes the transmission speed in resuming the wireless LAN communication, using the learnt real maximum transmission speed. For this reason, the accuracy of the transmission speed initializing process in the wireless LAN communication becomes higher and the probability of communication failure in the wireless LAN communication becomes lower. Therefore, it is feasible to further prevent the increase in call loss probability due to communication failure and thus to further increase the transfer efficiency as a result.

In the present embodiment, the transmission speed grasping unit 220 grasps the average transmission speed in the mobile wireless communication during the operation in which the mobile wireless communication is actually carried out between the mobile wireless communication unit 210 and the external network 10. Then the transmission speed initializing unit 230 sets the initial transmission speed for the wireless LAN communication unit 250 to next or thereafter start the wireless LAN communication with the client terminal 30, using the average transmission speed.

Namely, the transmission speed grasping unit 220 learns the average transmission speed in the mobile wireless communication and the transmission speed initializing unit 230 initializes the transmission speed in resuming the wireless LAN communication, using the learnt average transmission speed. For this reason, the accuracy of the transmission speed initializing process in the wireless LAN communication becomes higher and the probability of communication failure in the wireless LAN communication becomes lower. Therefore, it is feasible to further prevent the increase in call loss probability due to communication failure and thus to further increase the transfer efficiency as a result.

In the present embodiment, the start of the wireless LAN communication is retried at the transmission speeds gradually decreased from the initial transmission speed, which can determine an optimal transmission speed for a start of the wireless LAN communication.

Now, let us consider a situation where the home gateway is constructed using an ordinary device used as installed fixedly, unlike the present embodiment. In this case, the fixed device tries initial transfer at the theoretical maximum transfer speed of wireless LAN (54 Mbps in the case of 802.11 g) and gradually decreases the transfer rate in accordance with failure. This data transfer start at the high transfer rate increases the call loss probability and, with an actual call loss, retransmission will be carried out, so as to result in a delay of transfer. If mobile communication is present in the system configuration of data transfer, the mobile communication will be a bottleneck, the trial of data transfer at the high transfer rate will lead to no succeed in actually increasing the speed, and the employment of the high transfer rate will lead to the disadvantage of further increasing the call loss probability.

In the present embodiment, therefore, the value according to the theoretical maximum transmission speed of the mobile wireless communication method is set as the initial transmission speed of the wireless LAN communication and the transfer rate is gradually decreased in accordance with failure. Since the transfer is started from the low rate in the present embodiment in this manner, it is feasible to reduce the call loss probability and decrease the delay. Although the transfer is started from the low rate, since the resultant transmission speed is dependent on the mobile communication, it is not different from the situation where the home gateway is constructed using the ordinary device used as installed fixedly. Furthermore, it is also possible to grasp an average or fastest mobile transmission speed by a learning function and to decrease the speed from the transfer rate according to the result of the grasp.

The preferred embodiment of the present invention was described above, but it is needless to mention that the present invention is by no means limited to the above embodiment.

For example, the above embodiment was described with FOMA as an example of the wireless communication method corresponding to the "first wireless communication method" in the scope of claims, but, without having to be limited to this, it is also possible to adopt other mobile communication unit, e.g., EDGE Evolution or GRPS; the theoretical maximum transmission speed in this case is about 1 Mbps or 171.2 Kbps. The above embodiment showed the wireless LAN communication method as an example of the wireless communication method corresponding to the "second wireless communication method" in the scope of claims, but, without having to be limited to this, it is also possible to adopt, for example, Bluetooth; the theoretical maximum transmission speed in this case is about 3 Mbps.

The system may also be configured as follows: when the real maximum transmission speed or the average transmission speed is updated during communication, the initial rate is dynamically modified using the updated real maximum transmission speed or average transmission speed.

INDUSTRIAL APPLICABILITY

The present invention provides the mobile wireless communication terminal capable of executing the data transmission relay function, while increasing the transfer efficiency with reduction in call loss probability, and the wireless communication method using the mobile wireless communication terminal.

The invention claimed is:

1. A mobile wireless communication terminal capable of performing data communication on the basis of a plurality of wireless communication methods with different theoretical maximum transmission speeds, said mobile wireless communication terminal comprising:

a first wireless communication interface configured to perform first data communication with an external network on the basis of a first wireless communication method, thereby to relay data transmitted between the external network and a client terminal belonging under the mobile wireless communication terminal;

a second wireless communication interface configured to perform second data communication with the client terminal on the basis of a second wireless communication method, thereby to relay data transmitted between the external network and the client terminal; and circuitry configured to obtain respective theoretical maximum transmission speeds of the first wireless communication method and the second wireless communication method; and set, based on the respective theoretical maximum transmission speeds, a value according to the theoretical maximum transmission speed of the wireless communication method with the slower theoretical maximum transmission speed out of the first wireless communication method and the second wireless communication method, as an initial transmission speed for the second wireless communication interface to first start the second data communication with the client terminal on the basis of the second wireless communication method, wherein the circuitry is further configured to, when the theoretical maximum transmission speed of the first wireless communication method is slower than the theoretical maximum transmission speed of the second wireless communication method, obtain at least one of a real maximum transmission speed and an average transmission speed during an operation in which the first wireless communication interface performs the first data communication with the external network on the basis of the first wireless communication method, and set a value according to at least one of the real maximum transmission speed and the average transmission speed as an initial transmission speed for the second wireless communication interface to next or thereafter start the second data communication with the client terminal.

2. The mobile wireless communication terminal according to claim 1, wherein the circuitry is further configured to control the transmission speed of the second wireless communication interface in such a manner that when the second wireless communication interface fails to perform the second data communication at the initial transmission speed with the client terminal, the second wireless communication unit retries a start of the second data communication at transmission speeds gradually decreased from the initial transmission speed.

3. The mobile wireless communication terminal according to claim 1, wherein the first wireless communication method is a mobile wireless communication method, the second wireless communication method is a wireless LAN communication method, and the circuitry is configured to set a value according to a theoretical maximum transmission speed of the mobile wireless communication method, as an initial transmission speed for the second wireless communication interface to first start the second data communication with the client terminal on the basis of the wireless LAN communication method.

4. A wireless communication method using a mobile wireless communication terminal capable of performing data communication on the basis of a plurality of wireless communication methods with different theoretical maximum transmission speeds, the wireless communication method comprising:

a first wireless communication step wherein first wireless communication interface of the mobile wireless communication terminal performs first data communication with an external network on the basis of a first wireless communication method, thereby to relay data transmitted between the external network and a client terminal belonging under the mobile wireless communication terminal; and a second wireless communication step wherein second wireless communication interface of the mobile wireless communication terminal performs second data communication with the client terminal on the basis of a second wireless communication method, thereby to relay data transmitted between the external network and the client terminal, the wireless communication method further comprising:

a transmission speed obtaining step wherein circuitry of the mobile wireless communication terminal obtains respective theoretical maximum transmission speeds of the first wireless communication method and the second wireless communication method; and a transmission speed initializing step wherein, based on the respective theoretical maximum transmission speeds, the circuitry of the mobile wireless communication terminal sets a value according to the theoretical maximum transmission speed of the wireless communication method with the slower theoretical maximum transmission speed out of the first wireless communication method and the second wireless communication method, as an initial transmission speed for the second wireless communication unit to first start the second data communication with the client terminal on the basis of the second wireless communication method,
wherein, when the theoretical maximum transmission speed of the first wireless communication method is slower than the theoretical maximum transmission speed of the second wireless communication method, the method further comprises
   obtaining, by the circuitry, at least one of a real maximum transmission speed and an average transmission speed during an operation in which the first wireless communication interface performs the first data communication with the external network on the basis of the first wireless communication method, and
   setting, by the circuitry, a value according to at least one of the real maximum transmission speed and the average transmission speed as an initial transmission speed for the second wireless communication unit to next or thereafter start the second data communication with the client terminal.

\* \* \* \* \*